United States Patent Office 2,875,495
Patented Mar. 3, 1959

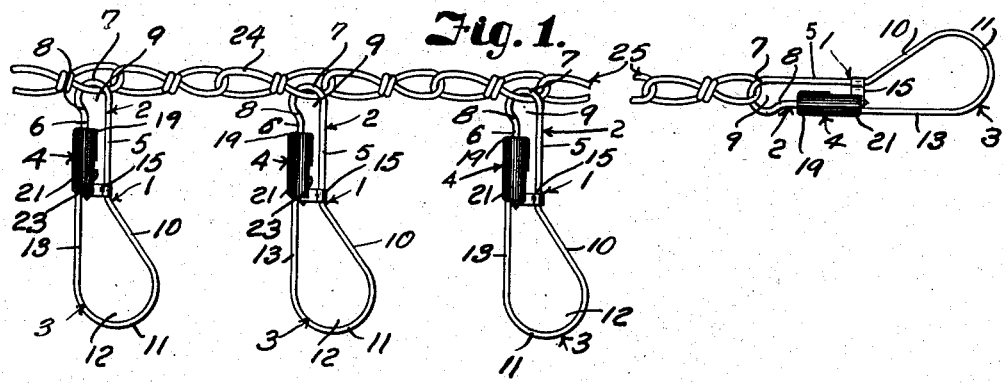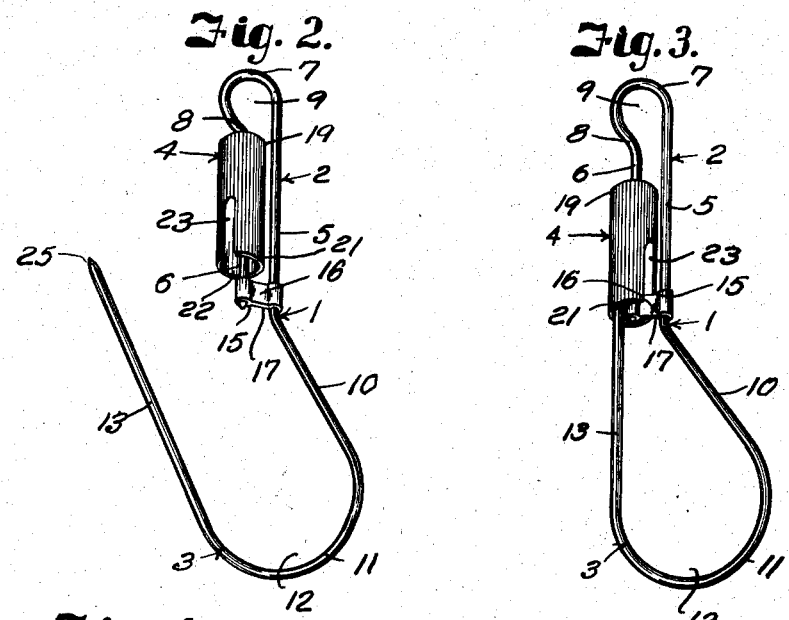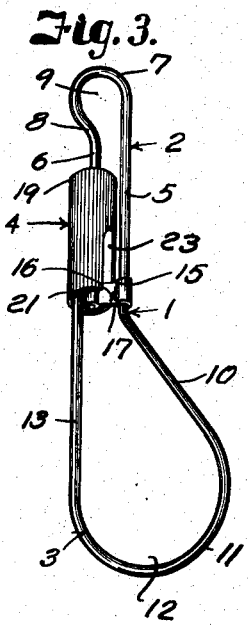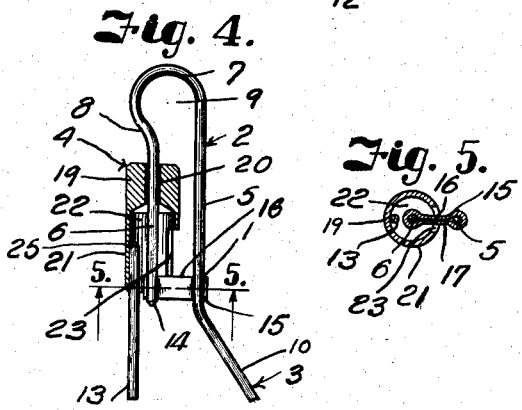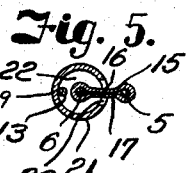
INVENTORS.
Hans Rudolph.
Jack Melvin Ford.
ATTORNEYS.

2,875,495
SAFETY HOOK

Hans Rudolph, Mission, Kans., and Jack Melvin Ford, Kansas City, Mo.

Application September 12, 1955, Serial No. 533,766

4 Claims. (Cl. 24—238)

This invention relates to safety fasteners of the type including a hook having the entrance thereof closed by a keeper which is movable on the shank of the hook. The principal object being to provide a fastener of this character that is of simple and inexpensive construction and which is easily and quickly operated.

Other objects of the invention are to provide a safety fastener having a resilient hook to cooperate with the shank in forming a relatively wide entrance when the fastener is in open condition, to provide a safety fastener with a keeper that is slidably rotatable on a part of the shank of the hook to engage and lock the hook in closed condition, to provide a safety fastener which is particularly adapted to be formed of wire stock material, to give the desired resiliency and to provide a safety hook wherein the keeper is locked in closed position.

In accomplishing these and other objects of the invention, as hereinafter pointed out, we have provided improved structure, the preferred form of which is illustrated in the accompanying drawing, wherein:

Fig. 1 is a fragmentary view of a fish retainer or stringer equipped with safety fasteners constructed in accordance with the present invention.

Fig. 2 is a perspective view of one of the safety fasteners showing the keeper in retracted position and the hook in open condition.

Fig. 3 is a similar view showing the keeper holding the hook in closed position.

Fig. 4 is a fragmentary section through the keeper and shank portion of the hook to better illustrate the construction, and showing the keeper in locked position.

Fig. 5 is a cross section on the line 5—5 of Fig. 4.

Referring more in detail to the drawings:

1 designates a safety fastener in the form of a hook including a shank 2, a hook portion 3, and a keeper 4. The shank and hook portions are formed of resilient or spring wire stock formed into shape whereby the shank 2 comprises parallel portions 5 and 6 interconnected at one end by a semi-circular loop portion 7 continuing from the portion 5 and connecting with the portion 6 in a reversely curved portion 8 which forms a stop for a keeper to be later described. The curved portions 7 and 8 thus cooperate to form an eye 9 at the end of the shank 2. Extending angularly from the opposite end of the shank portion 5 is the back portion 10 of the hook 3 and which joins with a curved portion 11 and in forming the seat 12 of the hook 3. The curved portion 11 continues in a straight portion which forms the prong or terminal 13 of the hook. In the relaxed position, shown in Fig. 2, the prong or tine 13 extends substantially parallel with the back portion 10 of the hook. The prong 13 is of a length to lap the free end 14 of the shank portion 6 (Fig. 4).

The ends of the shank portions 5 and 6 opposite the eye 9 are connected by a part or tie 15 that in the illustrated instance is preferably formed of a section of tubing having opposite diametrical sides pressed together, as indicated at 16 and 17 in Fig. 5, and the transverse diametrical portions are drawn about the shank portions 5 and 6 to securely anchor the free end of the shank portion 5 to the shank portion 6.

The keeper 4 includes a cylindrical body 19 having an axial opening 20 (Fig. 4) of a size to slidably mount the keeper on the shank portion 6. Extending from the body 19 of the keeper is an annular skirt 21 which surrounds the shank portion 6 to provide an annular space or passageway 22 therebetween having a transverse width slightly greater than the diameter of the wire stock from which the fastener is formed. The skirt 21 is open at the end adjacent the tie to connect with the passageway 22 and the skirt is provided with a slot 23 of sufficient length so that when the keeper is in the retracted position, shown in Fig. 2, the terminal or prong 13 of the hook may be passed through the slot and into the passageway 22 to close the hook. The slot 23 is of a width to freely pass the terminal or prong and to accommodate the thickness of the web portions 16 and 17 of the tie 15 when the keeper is turned on the shank portion 6 to a position where the slot 23 registers with the keeper. The skirt portion of the keeper may then be moved over the terminal of the prong with the edges of slot 23 moving downwardly over the tie so as to form a lock therewith and prevent accidental turning of the keeper, as later described.

The hook, constructed as described, is adapted for many uses. For example, as hooks on a fish retainer or stringer, shown in Fig. 1. In this instance the eyes of the fasteners are engaged with links 24 of a chain 25. In assembling the safety hooks and securing them to the links 24 of the chain, the end 14 of the shank portion 6 is passed through a link 24 of the chain prior to application of the tie 15. The keeper 4 is then applied to the shank portion 6 by sliding it over the free end 14. The section of tubing that forms the tie 15 is then passed over the prong 13 of the hook and moved therearound until it is in position to also pass over the free end 14 of the shank portion 6 whereupon the tie is flattened, as shown in Fig. 5, so as to securely retain the shank portions 5 and 6 in parallel relation and close the eye 9.

In the case of a fish stringer or retainer, the terminal or prong 13 is preferably sharpened, as indicated at 25, so as to impale the lip of a fish thereon and which is moved downwardly along the prong to engage the seat portion 12 of the hook. The prong 13 is then pressed inwardly toward shank portion 2 to bring the terminal thereof into juxtaposition with the shank portion 6, the terminal of the prong being passed through the slot 23 of the keeper 19. The keeper 19 is then rotated on the shank portion 6 to bring the notch 23 thereof into aligning registry with the web or portions 16 and 17 of the tie 15 whereupon the keeper 19 is moved downwardly along the shank portion 6 with the slot 23 passing over the tie whereby the keeper is prevented from any rotation that might bring the slot 23 into position where it might release the terminal of the prong. When the keeper is thus engaged, the prong of the hook is securely locked in closed position to securely retain the fish thereon. The fish is readily removed from the hook by moving the keeper retractively on the shank portion 6 so as to clear the tie. The keeper is then rotated to bring the slot 23 into registry with the prong whereupon the prong springs outwardly through the slot 23 to the open position, shown in Fig. 2. The fish may then be readily withdrawn from the prong 13 since an ample space has been opened between the shank and the hook, as a result of the resilient action of the prong.

From the foregoing, it is obvious that I have provided a safety fastener of simple and inexpensive construction and which is easily operated.

It is also obvious that the keeper, in cooperation with the partciular formation of the shank, provides a secure retention of the prong portion of the hook in closed position and that the slot in the skirt portion provides a positive lock when it is engaged with the tie 15.

It is also obvious that the body portion 19 of the keeper provides a closed end for the annular passageway 22, and that the opening 20 therethrough provides an axial bore slidably fitting the shank portion and of a length to provide sufficient bearing contact with the shank portion for maintaining stabilized linear movement of the keeper on the shank portion when the keeper is reciprocated to and from retracted and projected positions relative to the part that connects the shank portion with the hook portion. Therefore, the keeper can be rotated easily on the shank, and the bearing contact will prevent any tendency for the keeper to tilt on the shank portion. Therefore, it is necessary to effect a positive reciprocatory movement of the keeper on the shank portion before the keeper can be rotated and the terminal of the hook can be released.

What we claim and desire to secure by Letters Patent is:

1. A safety hook for fish stringers, said hook including spaced apart parallel shank portions, a loop portion interconnecting the shank portions at one end, a hook portion continuing from the other end of one of the shank portions and having a terminal portion adapted to spring away from the corresponding end of the other shank portion to open said hook and adapted to be pressed into substantially lapping relation with the said corresponding end to close said hook, a tie interconnecting said corresponding ends of the shank portions, a keeper rotatable on the said other shank portion between said loop portion and the tie and having a skirt portion providing an annular passageway around the said other shank portion and open at the end adjacent said tie, said skirt portion having a slot opening into the annular passageway to pass the terminal portion of the hook into said annular passageway when the terminal portion is pressed to closed position, said keeper being rotatable to carry the slot out of registry with the terminal portion of the hook and into registry with the tie, and said keeper being slidable on the said other shank in said last named position of the keeper to pass the sides of the slot over the tie to prevent rotation of the keeper and to close the slot for locking the terminal portion of the hook in said annular passageway of the keeper.

2. A safety hook for fish stringers, said hook including spaced apart parallel shank portions, a loop portion interconnecting the shank portions at one end, a hook portion continuing from the other end of one of the shank portions and having a terminal portion adapted to spring away from the corresponding end of the other shank portion to open said hook and adapted to be pressed into substantially lapping relation with the said corresponding end to close said hook, said loop forming an offset with the other shank portion to provide a stop, a tie connecting said corresponding ends of the shank portions, a keeper rotatable on the said other shank portion between said stop and the tie and having a skirt portion providing an annular passageway around the said other shank portion and open at the end adjacent said tie, said skirt portion having a slot opening into the annular passageway to pass the terminal portion of the hook into said annular passageway when the terminal portion of the hook is pressed to closing position, said keeper being rotatable to carry the slot out of registry with the terminal portion of the hook and into registry with the tie, and said keeper being slidable on the said other shank in said last named position of the keeper to pass the sides of the slot over the tie to prevent rotation of the keeper and to close the slot for locking the terminal portion of the hook in said annular passageway of the keeper.

3. A safety hook for fish stringers, said hook including spaced apart parallel shank portions, a loop portion interconnecting the shank portions at one end, a hook portion continuing from the other end of one of the shank portions and having a terminal portion adapted to spring away from the corresponding end of the other shank portion to open said hook and adapted to be pressed into lapping relation with said corresponding end to close said hook, all of said portions comprising a continuous resilient wire shaped to provide said portions, said hook having a part connecting said corresponding ends of the shank portions, a keeper rotatable on the said other shank portion between said loop portion and said part and having a skirt portion providing an annular passageway around the said other shank portion and open at the end adjacent said part, said skirt portion having a slot opening into the annular passageway to pass the terminal portion of the hook into said annular passageway when the terminal portion of the hook is pressed to closed position and through the slot into said annular passageway, said keeper being rotatable to carry the slot out of registry with the terminal portion of the hook and into registry with said part, and said keeper being slidable on the said other shank in said last named position to pass the sides of the slot over said part to prevent rotation of the keeper and to close the slot for locking the terminal portion of the hook in said annular passageway of the keeper.

4. A safety hook for attachment to the chain of a fish stringer, said safety hook including a shank portion, a hook portion, and a part connecting the shank portion with the hook portion, means on the shank portion for connecting the hook with the chain, said hook portion having a resilient terminal adapted to spring away from the shank portion to open the hook and adapted to be pressed into lapping parallel relation with the shank portion for closing the hook, a cylindrical keeper rotatable and reciprocable on said shank portion to and from retracted and projected positions with respect to said connecting part, said keeper having a closed end provided with an axial bore slidably fitting the shank portion and of a length to provide sufficient bearing contact with the shank portion for maintaining stabilized linear movement of the keeper on said shank portion when reciprocated on the shank portion to and from said positions, said keeper having an annular cylindrical skirt portion spaced radially from the shank portion for providing an annular passageway around a part of the shank portion of slightly greater radial width than the size of the terminal and open at the end nearest said connecting part, said skirt portion having a slot extending therethrough in the longitudinal direction of said shank portion and opening through said open end of the keeper for passing the terminal portion of the hook therethrough when the keeper is rotated on the shank portion to register the slot with the terminal, and when the keeper is in said retracted position on the shank portion, to pass said terminal through said slot and into the annular passageway, said terminal being adapted to be retained in said annular passageway when the keeper is rotated on the shank portion to carry the slot into registry with said connecting part and to pass the connecting part into the slot when the keeper is reciprocated to said projected position on the shank portion, to prevent rotation of the keeper when in said projected position for locking the terminal of the hook portion in said passageway.

References Cited in the file of this patent

UNITED STATES PATENTS

| Number | Name | Date |
|---|---|---|
| 199,511 | Butler | Jan. 22, 1878 |
| 398,141 | Farmer | Feb. 19, 1889 |
| 649,515 | Grozinger | May 15, 1900 |
| 671,615 | Snedeker | Apr. 9, 1901 |
| 1,194,809 | Bigney | Aug. 15, 1916 |
| 1,713,041 | Fey | May 14, 1929 |
| 1,761,187 | Ballou | June 3, 1930 |
| 2,297,623 | Hickman | Sept. 29, 1942 |
| 2,576,449 | DeLyra | Nov. 27, 1951 |

FOREIGN PATENTS

| Number | Country | Date |
|---|---|---|
| 1,066,651 | France | Jan. 20, 1954 |